(No Model.)
R. H. SOULE.
PIPE CONNECTION FOR CARS.
No. 409,120. Patented Aug. 13, 1889.
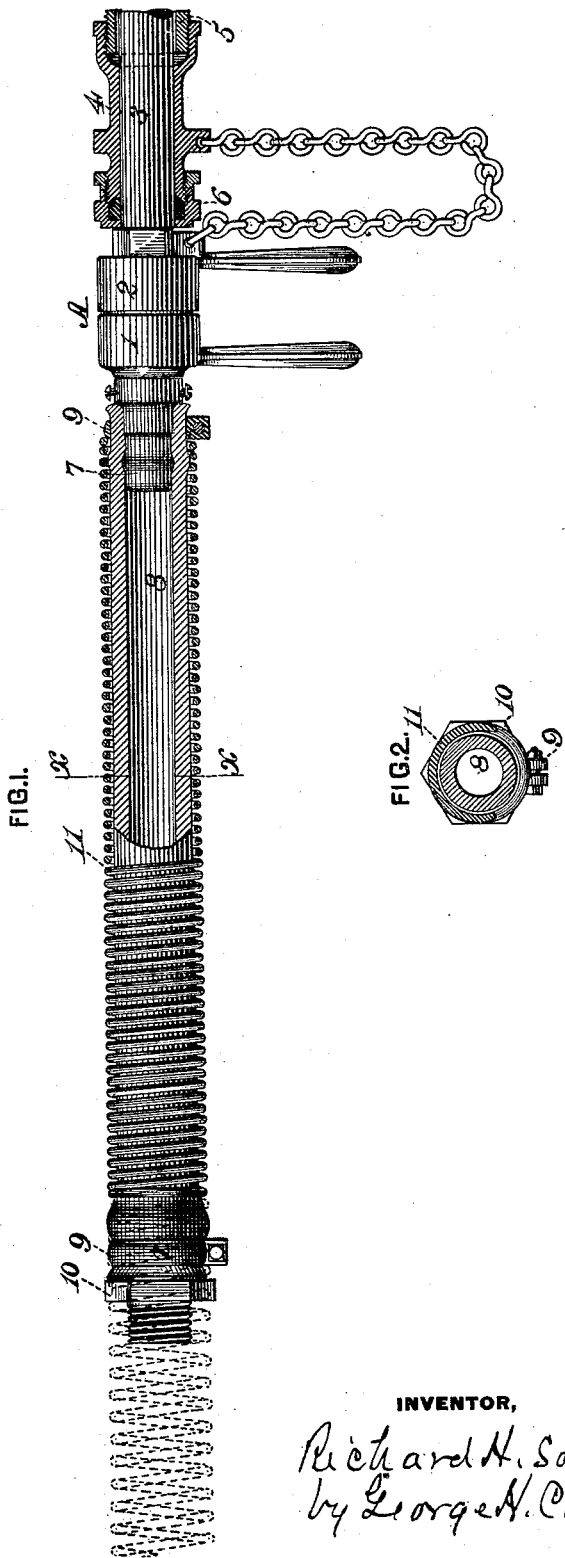
WITNESSES:
Darwin B. Wolcott.
F. E. Gaither.
INVENTOR,
Richard H. Soule,
by George H. Christy,
Att'y.

UNITED STATES PATENT OFFICE.

RICHARD H. SOULE, OF PITTSBURG, PENNSYLVANIA, ASSIGNOR TO THE STANDARD CAR HEATING AND VENTILATING COMPANY, OF SAME PLACE.

PIPE-CONNECTION FOR CARS.

SPECIFICATION forming part of Letters Patent No. 409,120, dated August 13, 1889.

Application filed April 15, 1889. Serial No. 307,340. (No model.)

*To all whom it may concern:*

Be it known that I, RICHARD H. SOULE, a citizen of the United States, residing at Pittsburg, in the county of Allegheny and State of Pennsylvania, have invented or discovered certain new and useful Improvements in Pipe-Connections for Cars, of which improvements the following is a specification.

The invention described herein relates to certain improvements in connections for uniting lines of pipe arranged under adjacent cars for the purpose of conducting fluid, whether employed for heating the cars or for other purposes. Such connections must necessarily have a certain amount of flexibility on account of the oscillations of the cars; hence it is customary to make a part of such connections of rubber hose. In cases where it is desirable that the connection should be in or approximately in the same horizontal plane as the lines of pipe under the car it is necessary that a portion of the connection should be made capable of elongation and contraction—*i. e.*, that an expansible joint should be incorporated in the connection—in order that the connection may accommodate itself to the movements of the cars toward and from each other. In spite of the expansible joint thus provided great difficulty has been experienced in preventing the hose from being bent or kinked by the movement of the cars toward each other, either during the coupling operation or when stopping at stations or elsewhere.

The object of the invention described herein is to provide means whereby the hose may be held in a straight line or straightened when bent.

The invention is hereinafter more fully described and claimed.

In the accompanying drawings, forming a part of this specification, Figure 1 is a view, partly in elevation and partly in section, of a connection embodying my invention; and Fig. 2 is a transverse section on the line *x x*, Fig. 1.

The members 1 and 2 of the coupling A may be of any suitable construction, but preferably that shown and described in an application, Serial No. 296,003, filed January 10, 1889. To the member 2 is secured a section of pipe 3, adapted to slide back and forth in the pipe-section 4, which is connected at its rear end to the train-pipe 5 and is provided at its front end with a stuffing-box 6, forming a tight joint around the pipe-section 3. The expansible joint thus formed permits of the connection accommodating itself to the varying distances between cars. The member 1 of the coupling is provided with a nipple 7, onto which one end of the loose section 8 is slipped and secured in place by the band 9, the opposite end of the hose-section being similarly secured to a like nipple on the fitting 10, which in practice is secured to train-pipe of an adjacent car. In order to prevent the movement of the cars toward each other in coupling, or when in use on the road from bending the loose section rather than forcing the pipe-section 3 into the section 4, a heavy coiled spring 11 is interposed between the bands 9 employed for securing the ends of the hose onto the nipples of member 1 of the coupling and of the fitting 10, said bands being constructed to form abutments against which the ends of the spring may bear. This spring is made considerably longer than the hose-section 8, as indicated by dotted lines, and sufficiently heavy, so that when confined between the abutments or bands 9 it will exert sufficient longitudinal tensional force upon the hose to overcome any resistance which there may be, caused by the movement of the pipe 3 through the stuffing-box 6 into the pipe-section 4, thereby preventing any bending or kinking of the hose-section, or, in case of bend or kink being formed by reason of the rapidity of the car movements, the spring will force the pipe-section 3 through the stuffing-box, thus restoring the connection to normal condition.

While preferring to arrange the spring outside of the hose, as affording protection to the hose against external injury and wear, it is obvious that the spring will perform its principal function—*i. e.*, maintaining the hose in a practically straight or unbent condition, if arranged between suitable abutments inside the hose. Any suitable form or construction of abutments or shoulders may be employed in lieu of the bands 9, if desired.

It is obvious that the invention is applicable in other places where it is desired to hold a section of flexible tubing in a practicable straight condition, and by that I mean in such a condition as to permit of the free uninterrupted passage of fluid along the tube, for it is obvious that the spring will not prevent a lateral bending of the tubing, nor is it intended so to do; but it will prevent any kinking or forcing one side in against the other, thereby either wholly or partially closing the tubing.

I claim herein as my invention—

1. The combination of a section of hose or flexible tubing having suitable abutments or shoulders and a spring under compression interposed between said abutments, substantially as set forth.

2. The combination of a section of flexible tubing having suitable abutments or shoulders and a spring under compression interposed between said abutments and surrounding the tubing, substantially as set forth.

3. The combination, in a pipe-connection, of an expansible joint, a section of flexible tubing provided with abutments or shoulders, and a spring under compression interposed between said abutments, substantially as set forth.

In testimony whereof I have hereunto set my hand.

RICHARD H. SOULE.

Witnesses:
W. B. CORWIN,
DARWIN S. WOLCOTT.